(12) United States Patent
Cseri et al.

(10) Patent No.: US 6,708,164 B1
(45) Date of Patent: Mar. 16, 2004

(54) TRANSFORMING QUERY RESULTS INTO HIERARCHICAL INFORMATION

(75) Inventors: Istvan Cseri, Redmond, WA (US);
Goetz Graefe, Bellevue, WA (US);
Frank Mantek, Wermelskirchen (DE);
Michael Mee, Seattle, WA (US);
Michael Rys, Issaquah, WA (US);
Gideon Schaller, Bellevue, WA (US);
Oliver Seeliger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/528,078

(22) Filed: Mar. 17, 2000

(51) Int. Cl.$^7$ .............................................. G06F 17/30
(52) U.S. Cl. ............................................... 707/4; 707/5
(58) Field of Search .................. 709/203, 217–219; 707/513, 501.1, 200, 5, 1

(56) References Cited

U.S. PATENT DOCUMENTS 6,356,920 B1 * 3/2002 Vandersluis ............... 707/501.1
6,366,934 B1 * 4/2002 Cheng et al. ............... 707/200

OTHER PUBLICATIONS

Oracle8 concepts Dec., 1997, Oracle Corporation.*
S. Abiteboul, D. Quass, J. McHugh, J. Widom, and J. Wiener. The Lorel query language for semistructured data. International Journal of Digital Libraries, 1(1):68–88, 1997.*
A. Deutsch, M. F. Fernandez, and D. Suciu. Storing semi-structured data with STORED. In SIGMOD '99, pp. 431–442, 1999.*
Jayavel Shanmugasundaram, Kristin Tufte, Chun Zhang, Gang He, David J. DeWitt, Jeffrey F. Naughton: Relational Databases for Querying XML Documents: Limitations and Opportunities. VLDB 1999: 302–314.*
"XML–QL: A Query Language for XML", http://www.w3.org/TR/1998/NOTE-xml-ql-19980819/ , Submission to the World Wide Web Consortium, 1–19, (Aug. 19, 1998).
Wadler, P., "XML", http://www.cs.bell-labs.com/who/wadler/topics/xml.html, A Data Model and Algebra for XML Query, 1–3, (Nov., 1999).

* cited by examiner

Primary Examiner—Diane D. Mizrahi
Assistant Examiner—Yicun Wu
(74) Attorney, Agent, or Firm—Woodcock Washburn LLP

(57) ABSTRACT

A computerized system and method for transforming the results of a query into a hierarchical information stream, such as an extensible Markup Language (XML) data stream is disclosed. A database server receives a query and generates a rowset. A rowset processor, using the mode specified in the query, processes the rowset and query to generate the XML data stream. For the "auto1" mode, the rowset processor transforms a rowset into an XML data stream using primary-foreign key information specified in the query to determine nesting. For the "auto2" mode, the rowset processor transforms a rowset into an XML data stream using table ordering information included in the query to determine nesting. For the "explicit" mode, the rowset processor transforms a rowset into an XML data stream using the explicit organizational information specified in the query.

6 Claims, 5 Drawing Sheets

```
<Customer name="Smith">
   <Order oids="1397">
      <Orderdetail quantity="10" product="ABC" price="100"/>
      <Orderdetail quantity="5" product="DEF" price="50"/>
      <Orderdetail quantity="2" product="GHI"/>
      <Employee id="987"/>
   </Order>
</Customer>
```

| TAG | PARENT | Customer!1!cid | Customer!1!name | Order!2!id | Order!2!date | OrderDetail!3!id!id | OrderDetail!3!id!idref |
|---|---|---|---|---|---|---|---|
| 1 | NULL | C1 | "JANINE" | NULL | NULL | NULL | NULL |
| 2 | 1 | C1 | NULL | 01 | 1/20/1996 | NULL | NULL |
| 3 | 2 | C1 | NULL | 01 | NULL | OD1 | P1 |
| 4 | 2 | C1 | NULL | 01 | NULL | OD2 | P2 |
| 5 | 1 | C1 | NULL | 02 | 3/29/1997 | NULL | NULL |

Figure 5

TRANSFORMING QUERY RESULTS INTO HIERARCHICAL INFORMATION

TECHNICAL FIELD OF THE INVENTION

This invention relates to data processing, and more particularly to the use of hierarchical information in the context of transformational systems.

BACKGROUND OF THE INVENTION

Two trends in networked computing are the increasing use hierarchical information systems, such as the eXtensible Markup Language (XML) for information exchange among networked applications and the continuing and increasing use of relational database systems for managing businesses. These trends are likely to continue and accelerate in the future.

XML is widely used for exchanging hierarchical information in networked systems, such as local area networks, wide area networks, and the internet. XML has several characteristics that make it an attractive language for exchanging information among networked applications. First, XML is a text based language, so XML data streams are easily transported across systems with incompatible binary formats. Second, since information represented in XML is organized hierarchically, it allows a user to easily understand the relationships among the different types of information contained in an XML data stream.

Relational database systems provide access to a significant percentage of all the information stored in modern business information processing systems. Relational database systems also allow users of the data to easily access and process the information stored in the systems from both local and remote locations. Unfortunately, database queries executed against a relational database return information in the form of rowsets encoded either in binary or in nonstandard character format.

For these and other reasons there is a need for the present invention.

SUMMARY OF THE INVENTION

The above-mentioned shortcomings, disadvantages and problems are addressed by the present invention, which will be understood by reading and studying the following specification.

A database, such as a relational database, typically processes a query and returns rowsets to the process initiating the query. The present invention provides for the transformation of the rowsets into an XML data stream.

A request for an XML data stream is included in the query. The request specifies a mode for organizing the information returned in the XML data stream. In a first example mode primary-foreign key information is utilized in the transformation from the rowset to XML. For this mode, the returned rowsets are transformed into a graph. The graph is transformed into a tree, which defines the organization of the information included in the XML data stream, by using the primary-foreign key information. In a second example mode, the order of the tables in the query defines the organization of the XML data stream. In a third example mode, an explicit definition of the organization of the rowset stream is contained in the query. The definition includes nesting information. The rowsets returned from the query are in a universal table format which includes the aforementioned nesting information. The universal table is transformed into an XML data stream. The present invention is not limited to a rowset stream. A buffered rowset may also be used in connection with the present invention. In addition, the listed example modes are not intended to be an exhaustive list of modes in which the present invention may be practiced.

The invention includes systems, methods, computers, and computer-readable media of varying scope. Besides the embodiments, advantages and aspects of the invention described here, the invention also includes other embodiments, advantage and aspects, as will become apparent by reading and studying the drawings and the following description.

BRIEF DESCRIPTION OF THE DRAWINGS

FIG. 5 is an example diagram of a universal table of FIG. 3.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware Operating Environment

Figure 1:
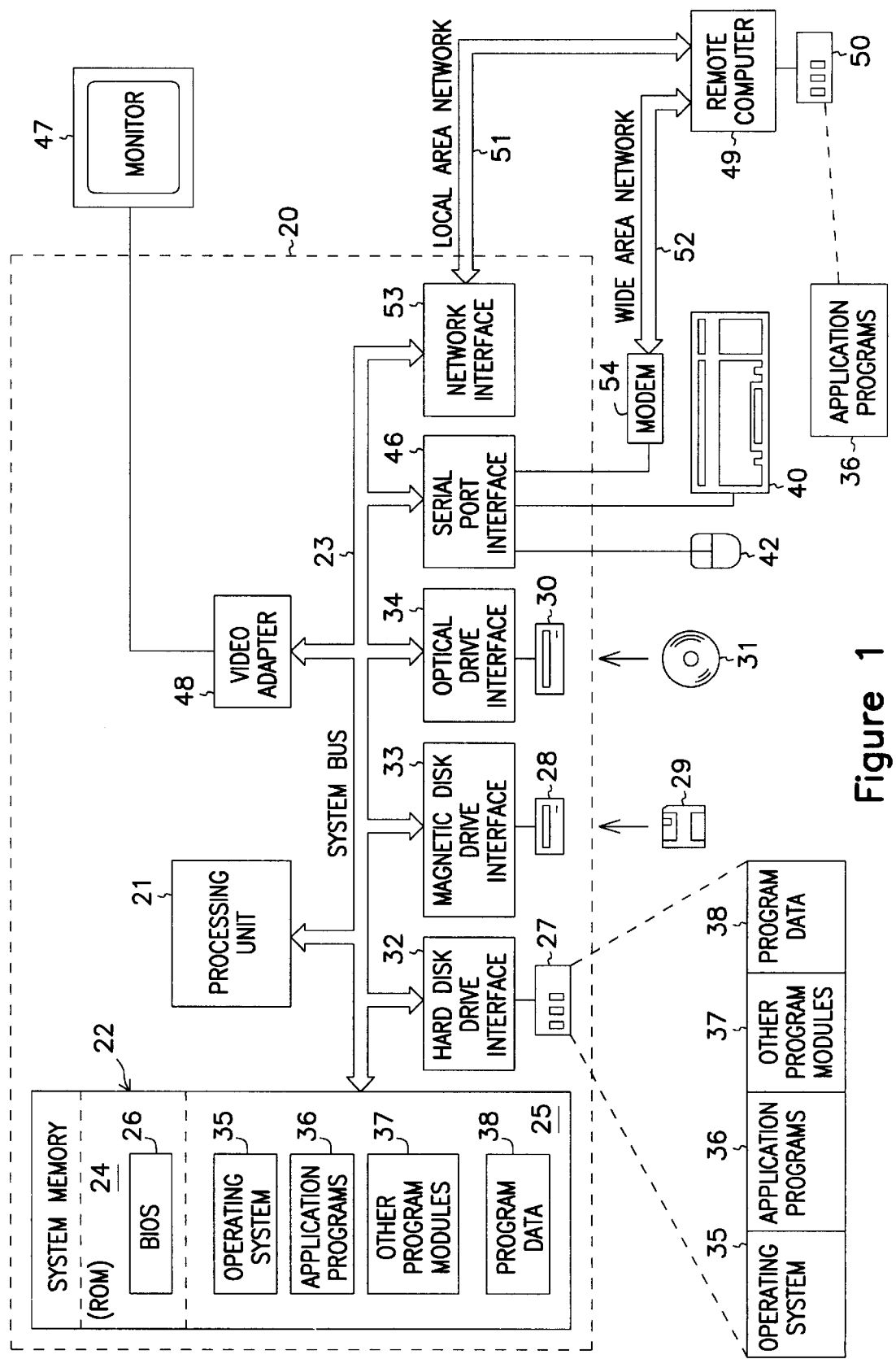
FIG. 1 illustrates example embodiments of a hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored or encoded in a machine readable medium such as the hard disk, magnetic disk 29, optical disk 31, ROM 24, RAM 25, or an electrical signal such as an electronic data stream through a communications channel, including an operating system 35, one or more application programs 36, other program modules 37, and program data 38. As described below in more detail, operating system 35 may allocate memory such as RAM 25 into kernel-mode memory or user-mode memory. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communications device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Example Embodiments of the Invention

Overview

The present invention includes embodiments of a computerized system and methods for processing a row producing query, such as SQL, and returning hierarchical data, such as an XML data stream. The SQL query provides several selectable modes of operation. In the "auto1" mode, elements of the relational schema, such as primary-foreign key information, are utilized to generate a hierarchical mapping of the rowsets for use in defining the organization of the information in the XML data stream. In the "auto2" mode, the ordering information of the tables as used in the query is utilized to generate a mapping of the rowsets into the XML data stream. Finally, in the "explicit" mode, information in the query explicitly defines the organization of the information in the SQL query. The syntax of the information in the SQL query that define an "explicit" mode query or the particular keywords selected to define the method of generating a rowset in the explicit mode are only design choices and may be expressed in a number of ways without limiting the present invention.

Figure 2:
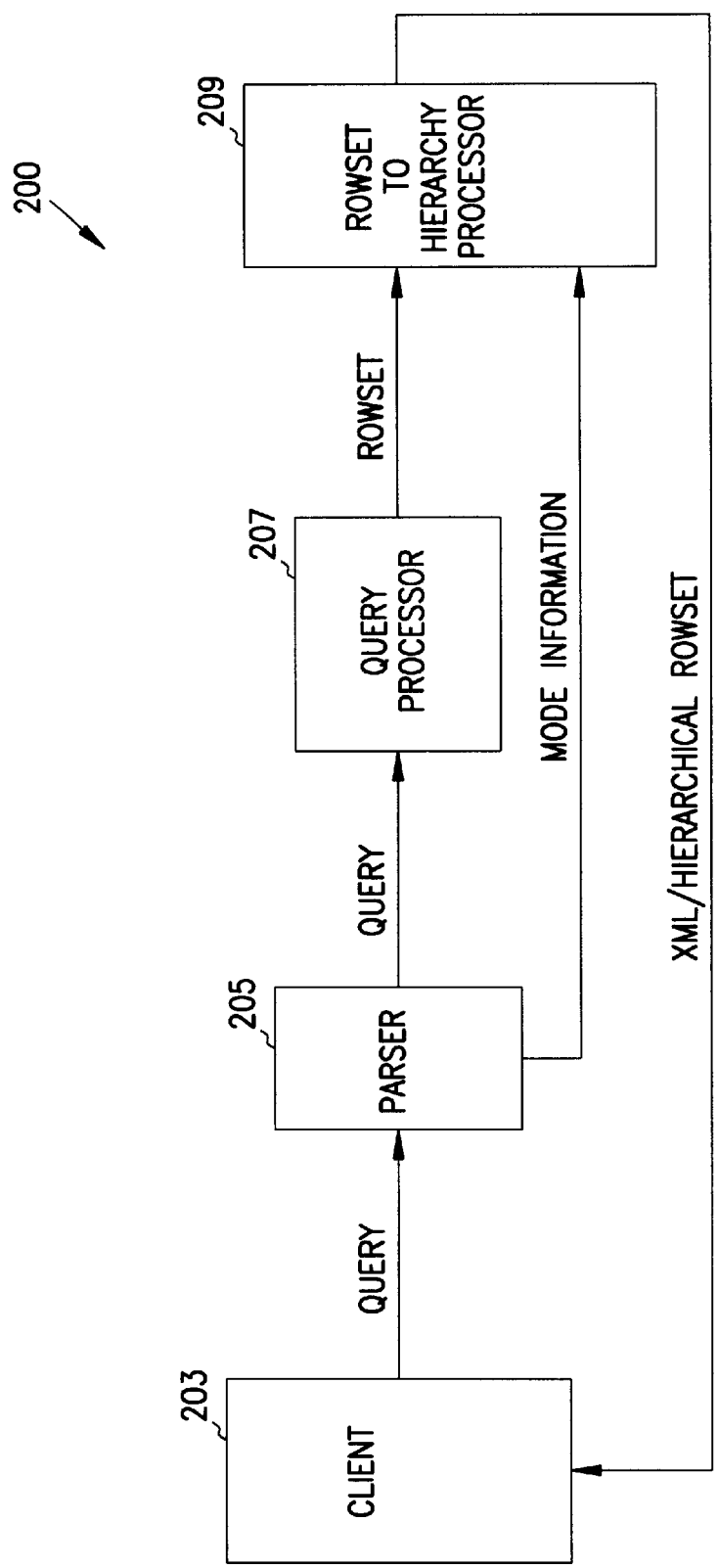
FIG. 2 is a block diagram of example embodiments of a computerized system for transforming query results into an XML data stream.

FIG. 2 is a block diagram of example embodiments of computerized system 200 for transforming query results into an XML data stream. An XML data stream is an unbuffered data stream. Although this example shows an unbuffered data stream, the present invention is not limited to use in connection with an unbuffered data stream. A buffered datastream may also be used in connection with the present invention. In one embodiment, computerized system 200 comprises client 203, parser 205, query processor 207, and rowset processor 209. For client 203 executing as a process on remote computer 49 as shown in FIG. 1 and for parser 205, query processor 207, and rowset processor 209 executing as processes on computer system 20 also as shown in FIG. 1, client 203 transmits a query to parser 205. Parser 205 strips mode information from the query and sends the mode information to rowset processor 209. Parser 205 also sends the query to query processor 207. Query processor 207 generates a rowset and sends the rowset to rowset processor 209. Rowset processor 209 processes the rowset received from query processor 207 and the mode information received from parser 205 to generate an XML datastream. The XML data stream is returned to client 203. In an alternate embodiment, client 203, parser 205, query processor 207, and rowset processor 209 all execute on the same computer system. In another alternate embodiment, parser 205, query processor 207, and rowset processor 209 are combined into a single software system. It is important to note that parser 205, query processor 207, and rowset processor 209 may operate on the same or a different computer. Alternatively parser 205 and query processor 207 may operate on a database server. Each of the operation modes of rowset processor 207 are described in greater detail below.

A particular XML mode of operation is communicated to database server 205 by defining the mode of operation in a SELECT statement. For example, the syntax for a SELECT statement requesting that the results of the query be returned as XML information under the "auto1" mode may be formed as follows:

SELECT . . .
FROM . . .
WHERE . . .
AND . . .
ORDER BY . . .
FOR XML auto1;

The syntax of the SELECT statement shown above is only one example of a syntax suitable for use in connection with the present invention. Any syntax that provides for specifying that XML information is to be returned and that provides for specifying a mode of operation is also suitable for use in connection with the present invention. In addition, the present invention is not limited to a syntax incorporating only flat queries. Nested queries, which are common in SQL statements, are also suitable for use in connection with the present invention.

The "auto2" mode is selected by substituting "auto2" for "auto1 " in the SELECT statement shown above. Similarly, the "explicit" mode is requested by substituting "explicit for "auto1" in the SELECT statement shown above.

After a mode is set, the result of an SQL query is transformed into an XML data stream according to mode specific rules. If a schema is requested, it can be prepended to the returned XML data as inline schema.

The scope of the mode specification for each of the described modes, in one embodiment, is limited in several ways and only affects the final result. First, the selected mode is in effect only for the execution of the statement in which it is specified. Second the selected mode does not affect the form of the results of subqueries or user defined function calls.

For any SQL text column (type char, nchar, varchar, nvarchar, text, ntext) that is mapped to an attribute (or element in the case of the element-centric option), the attribute contains the entitized text. If the text column is a binary data column, the default is that the attribute (or element) contains a URI single object access query that allows the retrieval of the data. Inlined base 64 encoding is returned in any mode, if the option BINARY base64 is specified. In summary, to use one of the modes described above in a client program, in one embodiment, a "FOR XML" clause is included in a SELECT statement. Specifying "FOR XML" results in an XML data stream being returned to the client in response to the SELECT statement. A mode designation in the "FOR XML" statement further defines the rules by which the results of the SQL query are converted to an XML data stream. After the SELECT statement is executed, streamed XML is returned to the client. Schema for the returned XML may also be requested and prepended to the streamed XML data.

Figure 3:
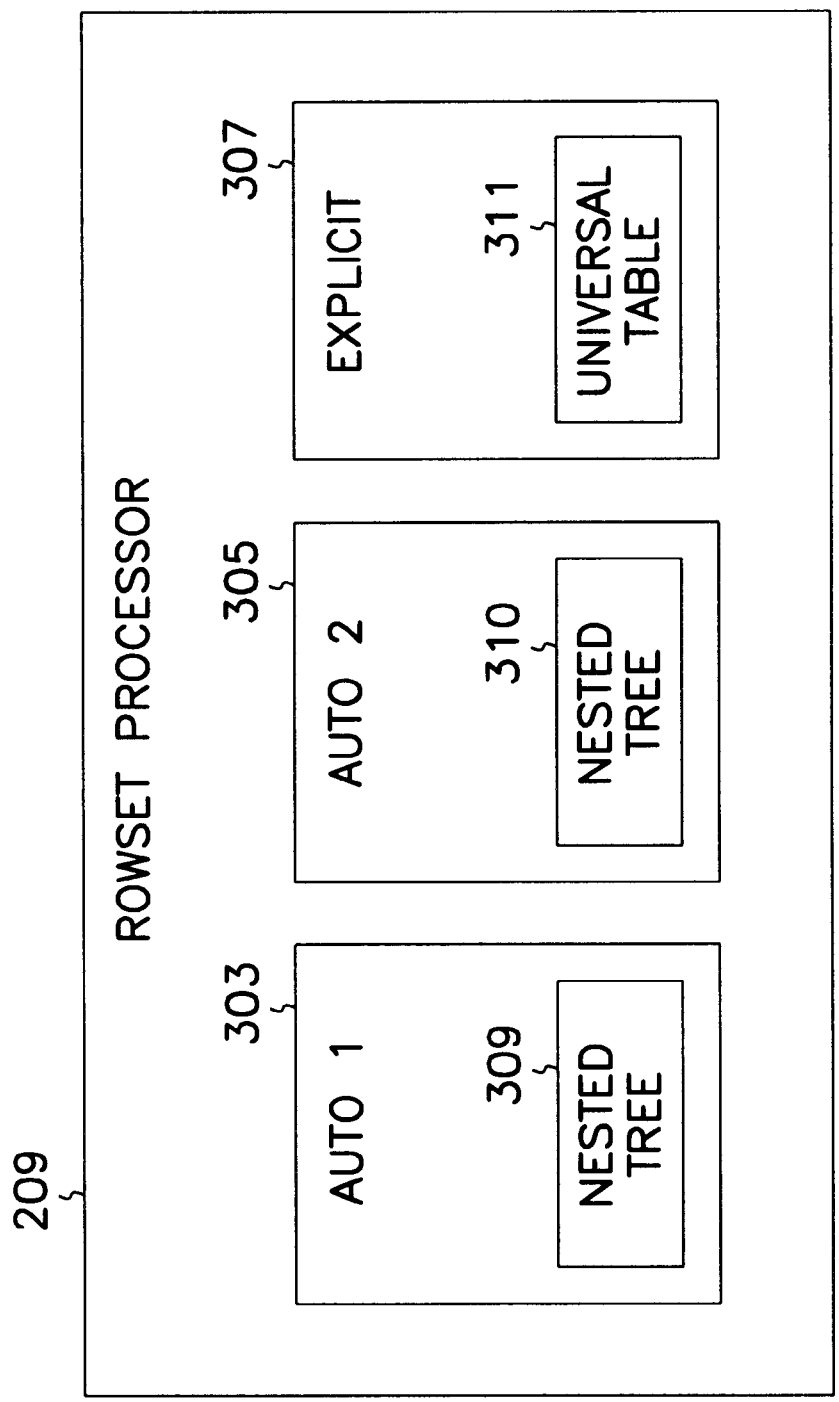
FIG. 3 is a block diagram of example embodiments of a rowset processor shown in FIG. 2.

Embodiments of the modes identified as "auto1" 303, "auto2" 305, and "explicit" 307 are shown in FIG. 3 as subsystems in rowset processor 209. "Auto1" 303 and "auto2" 305 include nested trees 309 and 310, respectively. Nested trees 309 and 310 are intermediate structures created during the generation of an XML data stream in the "auto1" 303 and "auto2" 305 modes. Universal table 311 is an intermediate structure created during the generation of an XML data stream in the "explicit" 307 mode. Universal table 311 is described in more detail below. Rowset processor 207 is not limited to a particular combination of modes. One or more of the listed modes may be included in rowset processor 207. A more detailed description of each mode is provided below.

Auto1 Mode

In one embodiment of the "auto1" 303 mode, each rowset returned from a query is transformed into a nested XML tree 309, which defines an XML data stream.

The transformation maps table and column information into the XML data stream. Each table listed in the SELECT clause that has at least one column in the query result is represented as an XML element. The table name (or alias if provided) maps to the XML element name. The column name (or alias if provided) maps to an attribute name or non-complex subelement. The default "auto1" 303 mode in one embodiment maps table columns to XML attributes.

The transformation also determines the correct organization or nesting of information included in the XML data stream. Each column in the query result or rowset is associated with a table. This provides a collection of tables participating in the query. A primary-foreign key graph is generated from the primary-foreign key relationships identified in the collection of tables. The organization of the graph is determined by examining the system catalog information.

Figures 4A, 4B:
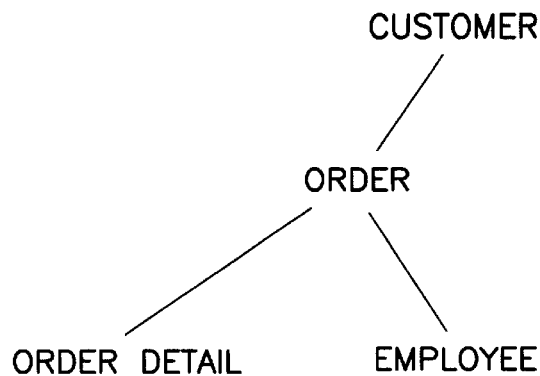
FIG. 4A is an illustration of a nested tree shown in FIG. 3.
FIG. 4B is an illustration of an XML representation of the nested tree shown in FIG. 4A.

FIG. 4A is an illustration of an example embodiment of a nested tree associated with the "auto1" 303 mode shown in FIG. 3. FIG. 4B is an illustration of an XML data stream derived from the nested tree shown in FIG. 4A. The indentations in the illustrated XML data stream indicate the nesting of the data stream elements. As can be seen by comparing FIG. 4A with FIG. 4B, the nesting of the XML data stream matches the nesting defined by the tree shown in FIG. 4A.

Some attributes and columns are considered separately from the tables for the purposes of determining the correct nesting. If an attribute of a table reference appears after the first occurrence of the table reference, then the attribute is added to the nesting level associated with the first occurrence of the table reference. If a column in the selected rowset cannot be associated with a table (e.g. it is an aggregation or a computed column), the column is added to the deepest nesting level in place at the time the column is encountered. If such a column appears as the first element, it is added to the top element.

Ensuring the correct nesting for a many-to-many, a many-to-one, or mutiple one-to-many relationships is achieved by arranging the order of the tables included in the SELECT statement to generate the desired result. Alternatively, if the first table is taken as a container, then all other relationships are disregarded. In a second alternative, if a relational schema provides information about cascading delete constraints, then the cascading delete constraints is taken to indicate nesting. In a relational system, a cascading delete constraint permits specifying that children of a parent are automatically deleted, if the parent is deleted.

In one embodiment, an ELEMENTS option is provided for use with the "auto1" 303 mode and the alternative modes described below. Selecting the ELEMENTS option causes table columns to be returned as non-complex subelements.

Auto2 Mode

In one embodiment, the operation of the "auto2" 305 mode is similar to the operation of the "auto1" 303 mode. However, one difference between the operation of the two modes is that the "auto2" 305 mode does not rely on primary-foreign key relationships to determine the correct nesting for the XML data stream. The nesting for the XML data stream in the "auto2" 305 mode is determined by the left-to-right ordering of the tables listed in the SELECT clause of the query. The first table listed maps to the top level element, and each table listed after the first table is nested within the preceding element. For example, for a three table list, the first table maps to the top level element. The second table listed is the second element and is nested within the top level element. And the third table listed is the third element and is nested within the second element.

Each table included in a query and that has at least one column in the query result is represented as an XML element. A table name (or alias if provided) maps to the XML element name. A column name (or alias if provided) maps to an attribute name or non-complex subelement name, if the ELEMENTS option is specified. The "auto2" 305 mode, in one embodiment, uses the first appearance, when reading from left to right, of a table in the select clause to determine the nesting level for the table. The left-outermost table is the top element, the second left-outermost table is nested within the top element, etc. If an attribute for a table reference appears later, it is added to the level of its table reference instead of opening a new level. If a column in the selected rowset cannot be associated with a table (e.g. it is an aggregation or a computed column (even if based on the same table)), the column is added to the deepest nesting level in place when the column is encountered in the list. If such a column appears as the first element, it is added to the top element. If the user specifies * as the sole entry in the selection clause, the nesting is determined as described above, based on the order in which the rows are returned by the query engine.

For example:
SELECT C.customerid, 'foo' as bar, O.orderid, C.contactname as name, O.orderdate as date
FROM Customers C left outer join Orders O on C.customerid=O.customerid
ORDER BY C.customerid
FOR XML auto2

Results in the following XML data:

<C customerid=" . . . "bar="foo" name=" . . . "><O orderid=" . . . " date=" . . . "/>

</C>

The "auto2" 305 mode can also express nesting against the 1:n direction (e.g. to deal with m:n relationships such as Address<-> Customer). A user can specify whether to group customers according to addresses or to group addresses according to customers. This is accomplished by positioning the tables in the select list accordingly.

The heuristics can use primary key-foreign key information, if available, to determine when a new element is generated. If the executed query plan does not provide the desired ordering of the rows, then in order to get the desired ordering, the use of order by clauses is recommended.

The "auto2" 305 mode, in one embodiment, is also capable of supporting several features related to names, views and subselects, and schemas. Names are changed by renaming the columns and the tables in the SQL statement. Some names may need to be translated into valid XML names. Views and subselects, in a FROM clause, are treated like tables. A set operation query only returns a schema based on the first selection of the union.

Explicit Mode

The "explicit" 307 mode embodiment permits a developer to process a specific rowset format that is then transformed to hierarchical data, such as XML. In the "explicit" 307 mode, information defining the nesting of the requested data and information defining the naming of the requested columns is explicitly included in the query.

In the "explicit" 307 mode example embodiment, a query is constructed to generate a universal table. A universal table includes meta data columns for element tags and meta data columns for parent tags. A universal table also encodes the XML generic identifiers and attribute names in the table column names. Once the element tags and the parent tags are added to a universal table, the universal table fully describes an XML data stream. The present invention is not limited to use with a particular universal table format. Hierarchical results, such as XML data can be produced from a number of universal table formats. FIG. 5 shows a tagged universal table having a simple Customer, Order, OrderDetail nesting.

A universal table is generated, in one embodiment, by applying a union over all selections that retrieve the desired element information. Each selection, in addition to the requested data columns, includes a tag number (>0) in a column named Tag and a parent tag number (>=0 or NULL) in a column named Parent. A parent tag number of zero or null indicates that a row is located directly under the top level element. In one embodiment, the tag column is the first column in the universal table and the parent column is the second column in the universal table. Each tag having a specific number is associated with only one parent number. To allow streaming of the result through an XML translator, the universal table is ordered by the element identifiers.

Referring to FIG. 5, the data in the illustrated embodiment of universal table 311 is vertically partitioned into groups that become XML elements in the result returned from the query. In this example, the results are the data shown in dashed boxes. Columns 503 and 505 contain the Tag and Parent numbers used for determining the nesting of the XML data stream. Column 507 contains data for inclusion in the XML data stream.

In one embodiment, the generic identifiers (GI), tag numbers, attribute names, and directives are encoded in the column names as GI!TagNumber!AttributeName! Directive. A generic identifier provides the resulting element's generic identifier, which for example universal table 311 shown in FIG. 5 is Customer and Order. The generic identifier may also be empty. An empty generic identifier produces no mark-up tags. TagNumber in combination with the Tag column and the Parent column defines the nesting of the resulting XML data. The Tag column provides the currently "active" tag number for each row, and the Parent column provides the tag number of the parent element for the row. AttributeName provides the name of the XML attribute (if directive is not set) or the name of the contained element (if directive is eitherxml, element orxmltext). In the later case, AttributeName can be empty. In the case where AttributeName is empty, the values contained in the column are directly contained by the element with the specified generic identifier. Specifying a directive is optional and is used to encode type information, such as ID/IDREF(S), by using the keywords id, idref, and idrefs, respectively, and to indicate how text data is mapped to XML using the keywords hide, element, xml, xmltext, and cdata.

Each of the keywords hide, element, xml, xmltext, and cdata provide alternate embodiments for including text and XML data in the XML data stream. The hide keyword blocks display or transmission of the associated attribute. The element keyword triggers the generation of a contained element with the specified name (or contain directly if no AttributeName is specified). In addition, the contained data is entitized. Entitization in XML uses specific markup to encode the standard markup characters such as <,>,&,',", so that the parser does not try to interpret them as markup. The xml keyword triggers the generation of a contained element with the specified name (or contain directly if no AttributeName is specified). However, unlike the element keyword, the contained data is not entitized. The xmltext keyword assumes the wrapping of column content by a single tag that is integrated with the rest of the document. If an AttributeName is specified, the name of the tag is replaced by the specified name, otherwise, the attributes are appended to the current list of attributes of the enclosing element and the content is placed without entitization at the beginning of the containment. If an attribute appears in the xmltext element that conflicts with an attribute that is retrieved on the same element level, the attribute in the xmltext is ignored and overwritten. The cdata keyword triggers containment of data by wrapping it with a CDATA section. The content is not entitized.

If no directive is provided, an attribute is specified. If no attribute name is specified and no directive is specified, an element directive is implied and the data is contained. Directives influence the generation of schemas in several ways. First, during the generation of schemas, the data types are inferred from the table attribute datatypes unless a datatype directive such as id, idref, idrefs, nmtoken, or nmtokens is specified. Second, none of the xml or xmltext subelements or attributes are added to the schema, however they imply an open content model. Third, the specified directives are also used to generate nesting information for the schema.

Thus, while the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof. In addition, database server includes not only relational database servers, but also other database servers, such as object oriented database servers.

What is claimed is:

1. A method for generating a hierarchical data stream from a query, comprising:

receiving the query, the query including an express designation of a hierarchical data stream organization;

generating a rowset in response to the query and processing the rowset to generate the data stream organized in accordance with the express designation included in the query, wherein the express designation comprises primary-foreign key relationships identified in one or more tables referenced in the query.

2. The method of claim 1, wherein elements of the hierarchal data stream are nested according to an ordered arrangement of the one or more tables referenced in the query.

3. A method for generating a hierarchical data stream from a query, comprising:

receiving the query, the query including an express designation of a hierarchical data stream organization;

generating a rowset in response to the query and processing the rowset to generate the data stream organized in accordance with the express designation included in the query, wherein the express designation determines a nesting for the data stream by an ordering of one or more tables referenced in the query.

4. The method of claim 3, wherein the ordering of one or more tables referenced in the query is a left-to-right ordering.

5. A method to produce a hierarchical data steam from a query comprising:

receiving the query, the query including information for generating a table;

generating a rowset in response to the query; and processing the rowset to produce the data stream defined by the table, wherein the query comprises information expressly defining nesting of the data stream and information expressly defining column names for the data stream.

6. The method of claim 5, wherein the query further comprises one or more of element tags and parent tags.

* * * * *